United States Patent Office 3,498,235
Patented Mar. 3, 1970

3,498,235
REFRACTORY COMPOSITION
Jacques R. Martinet, San Jose, Calif., assignor to Kaiser Aluminum & Chemical Corporation, Oakland, Calif., a corporation of Delaware
No Drawing. Filed Oct. 16, 1967, Ser. No. 675,308
Int. Cl. C04b 35/04, 35/70
U.S. Cl. 106—58                10 Claims

ABSTRACT OF THE DISCLOSURE

A periclase refractory with greatly enhanced high temperature strength is obtained when an evanescent alkali metal compound, for example sodium hydroxide, and finally divided silica, for example volatilized silica, are incorporated in the bond.

BACKGROUND

Probably the most common way of making refractory structural units is to take a granular refractory material and form it into a coherent mass using a bond material. Since refractories are intended for use at elevated temperatures, it is desired that the resulting bonded granular material show high strength, for example modulus of rupture, at elevated temperatures. It will be apparent that the strength of a refractory structural mass at elevated temperatures will depend greatly on the characteristics of the bond material used. Thus, the refractories industry continues to seek for a better method of bonding granular refractory material, one which will yield enhanced high temperature strengths.

SUMMARY OF INVENTION

It has been found, according to this invention, that a refractory composition of greatly enhanced high temperature strength, for example modulus of rupture at 1400° C., results when the composition consists essentially of a major portion of periclase refractory grain retained on a 100 mesh screen and a minor portion of bonding component including periclase grain passing a 100 mesh screen when there are also incorporated from 0.2% to 2%, based on the total weight of the composition, of an evanescent alkali metal compound, and from 0.1% to 1%, based on the total weight of the composition, of finely divided silica.

DETAILED DESCRIPTION

The periclase used in this invention can be any of the well known materials, either natural or synthetic, containing a high percentage of MgO. Preferably, the periclase contains at least 95% MgO and, most preferably, about 98% or more MgO. It is also preferred that the weight ratio of lime (CaO) to silica ($SiO_2$) in the periclase be relatively high, for example 2:1 or greater. The periclase will be in granular form, the sizing of the granules being such as to obtain maximum packing of the granular material when formed into a structural mass, as is well known in the art. As has been indicated, the major portion of the periclase will be granular material retained on a 100 mesh screen, while a minor portion, considered part of the bond portion of the composition, passes a 100 mesh screen.

The evanescent alkali metal compound used in this invention can be any such compound which will, upon heating, decompose and in which the negative radical will be driven off from the composition, for example by volatilization or by decomposition to a vapor. Generally, the alkali metal will be sodium, for reasons of economy and ready availability, but other alkali metals, including the ammonium radical, can be used. The evanescent alkali metal compound can be added in solid form, but it will generally be found more convenient to add it in solution, for example in aqueous solution.

The finely divided silica used in this invention preferably has a specific surface of at least 6000 $cm.^2/g$. A particularly preferred material is the amorphous form of silica known as volatilized silica, a material formed as a condensation product in the manufacture of ferrosilicon.

In adding silica in an amount within the limits set forth above, it is preferred to add such an amount that the total silica (the minor amount of silica impurity inherently present in the periclase grain plus the added finely divided silica) will form a lime-to-silica (C/S) ratio of about 1.86:1, on a weight basis. As will be recognized by those skilled in the art, this weight ratio between lime and silica corresponds to the compound dicalcium silicate.

Compositions according to this invention have the advantage, in addition to their greatly enhanced strengths at elevated temperatures, that there is less crystal growth of the periclase during firing, or in high temperature use, than in prior art periclase refractories bonded with other materials. This inhibition of the crystal growth results in a tightly knit structure which is relatively free of micro-cracks in the matrix.

EXAMPLE I

As an example of the practice of this invention, 100 parts of a periclase containing 98% MgO, 1.1% CaO, 0.4% silica, and 0.1% added chromium oxide, the remainder being iron and aluminum oxides and other minor impurities, the periclase being in brickmaking granular sizing, was combined with 0.5 part by weight sodium hydroxide and 0.3 part by weight volatilized silica, together with one part by weight of a lignin sulfonate temporary binder. The composition was formed into refractory brick by pressing, dried and fired at a temperature of 1700° C. for six hours. Specimens cut from the fired shapes were tested for modulus of rupture at 1400° C. and showed an average strength of 2576 p.s.i. Specimens from a duplicate composition made in the same way showed an average strength of 3050 p.s.i. when tested for modulus of rupture at 1400° C.

This example of a composition according to this invention is to be compared with a similar composition made from 100 parts of the same periclase grain but containing only one part by weight of the lignin sulfonate temporary binder and no NaOH or volatilized silica. This composition, when fired and tested in the same manner, had a modulus of rupture at 1400° C. of only 252 p.s.i. Likewise, the above composition according to this invention is to be compared with a similar composition containing 100 parts of the same periclase, one part lignin sulfonate temporary binder, and 0.5 part sodium hydroxide. This specimen cracked upon drying and it was impossible to process it further in order to obtain a specimen for testing. Apparently the deliquescent properties of sodium hydroxide caused the brick to rupture even before it was completely dry. Finally, the above composition according to this invention is to be compared with a similar composition made from 100 parts of the same periclase grain, one part of the lignin sulfonate temporary binder, and 0.3 part volatilized silica. This specimen, when processed and tested as described in Example I, showed a strength of 157 p.s.i.

It is also informative to compare the above composition according to this invention with a similar composition containing 100 parts of the same periclase, one part of the lignin sulfonate temporary binder, and one part of a sodium silicate with an $Na_2O:SiO_2$ mol ratio of 1:1. It can be seen that the mol ratio of soda to silica in the sodium silicate approximates that in the bond according to this invention. However, the composition with the sodium silicate bond, when processed and tested in the same manner as the composition of Example I, had a strength of only 1489 p.s.i.

Thus, it can be seen that the two components of the bond according to this invention, when used alone, lead either to a ruptured specimen which cannot even be tested or to one with a strength about 1/20 that of specimens with the combination bond. Also, the combination bond yields specimens having approximately twice the strength of specimens made with a sodium silicate bond of chemical composition comparable to that of the combination bond of this invention.

EXAMPLE II

As a further example of the practice of this invention, 100 parts by weight of the periclase used in Example I were admixed with 1.25 parts by weight sodium nitrate ($NaNO_3$) and 0.3 part by weight volatilized silica, together with one part by weight of lignin sulfonate temporary binder. This composition was formed into refractory brick shapes by pressing, dried, and fired at a temperature of 1700° C. for six hours. After firing, the bricks had a modulus of rupture of 987 p.s.i. at 1400° C. and 958 p.s.i. at 1500° C.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 200 mesh to 74 microns. Analyses of mineral components are reported in the usual manner, expressed as simple oxides, e.g., MgO, $SiO_2$, although the components may actually be present in various combinations, e.g., as a magnesium silicate.

Having now described the invention, what is claimed is:

1. In a refractory composition consisting essentially of a major portion of periclase refractory grain retained on a 100 mesh screen and a minor portion of a bonding component including periclase grain passing a 100 mesh screen, the improvement wherein said bonding component also contains from 0.2% to 2%, based on the total weight of the composition, of an evanescent alkali metal compound, and from 0.1% to 1%, based on the total weight of the composition, of finely divided silica.

2. Composition according to claim 1 wherein said evanescent alkali metal compound is a sodium compound.

3. Composition according to claim 2 wherein said evanescent sodium compound is sodium hydroxide.

4. Composition according to claim 2 wherein said evanescent sodium compound is sodium nitrate.

5. Composition according to claim 1 wherein said finely divided silica has a specific surface of at least 6000 cm.$^2$/g.

6. Composition according to claim 1 wherein said finely divided silica is amorphous silica.

7. Composition according to claim 1 wherein said finely divided silica is volatilized silica.

8. Composition according to claim 7 containing 0.5% sodium hydroxide and 0.3% volatilized silica.

9. Composition according to claim 1 which has been fired at a temperature of at least 1600° C.

10. Composition according to claim 1 wherein said periclase grain contains, as impurity, CaO and $SiO_2$ and wherein the amount of finely divided silica in the bond is such that the overall ratio of lime to silica in the composition is about 1.87:1.

References Cited

UNITED STATES PATENTS

| | | | |
|---|---|---|---|
| 3,208,861 | 9/1965 | Henry et al. | 106—58 |
| 3,275,461 | 9/1966 | Davies et al. | 106—58 |

JAMES E. POER, Primary Examiner